(12) United States Patent
Kuroda (10) Patent No.: US 8,019,475 B2
(45) Date of Patent: Sep. 13, 2011

(54) ROUTING APPARATUS FOR AUTONOMOUS MOBILE UNIT

(75) Inventor: Mitsuhide Kuroda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 832 days.

(21) Appl. No.: 12/078,686

(22) Filed: Apr. 3, 2008

(65) Prior Publication Data

US 2008/0269973 A1   Oct. 30, 2008

(30) Foreign Application Priority Data

Apr. 6, 2007   (JP) ................................. 2007-100190
Nov. 29, 2007  (JP) ................................. 2007-309285

(51) Int. Cl.
  *G05B 19/4061*  (2006.01)
  *G05B 19/18*    (2006.01)
  *G05B 15/00*    (2006.01)
  *G06F 19/00*    (2006.01)
  *G08G 1/16*     (2006.01)
  *G06G 7/78*     (2006.01)
(52) U.S. Cl. ......... 700/255; 700/245; 700/259; 701/301
(58) Field of Classification Search .................. 700/245, 700/253, 255, 259; 701/23, 25, 26, 27, 28, 701/35, 301, 302; 382/103, 104; 340/435, 340/436; 318/568.12, 568.23, 568.24
  See application file for complete search history.

(56) References Cited

U.S. PATENT DOCUMENTS

| 4,146,891 | A | * | 3/1979 | Fujiki et al. ........................ 342/71 |
| 5,570,285 | A |   | 10/1996 | Asaka et al. |
| 5,638,281 | A | * | 6/1997 | Wang ............................. 701/301 |
| 5,798,727 | A | * | 8/1998 | Shirai et al. ...................... 342/70 |
| 6,161,074 | A | * | 12/2000 | Sielagoski et al. .............. 701/96 |
| 6,169,572 | B1 | * | 1/2001 | Sogawa ......................... 348/113 |

(Continued)

FOREIGN PATENT DOCUMENTS

EP    0 307 015 A1    7/1994

(Continued)

OTHER PUBLICATIONS

Japanese Office Action application No. 2007-309285 dated Mar. 1, 2011.

(Continued)

*Primary Examiner* — Jamisue A Plucinski
*Assistant Examiner* — Thanh Nguyen
(74) *Attorney, Agent, or Firm* — Squire, Sanders & Dempsey (US) LLP (57) ABSTRACT

A routing apparatus includes a sensor unit which has capabilities to detect an object in a target field of view and measure position of the object, and an electronic control unit which controls movements of the autonomous mobile unit. An electronic control unit determines velocity and a travel direction of the object based on changes in the position of the object obtained from the sensor unit over a plurality of measurement cycles, determines a path of the autonomous mobile unit so as to avoid collision with the object based on the position, the velocity, and the travel direction of the object, and determines the path of the autonomous mobile unit by setting the velocity of the object to a value equal to or lower than a predetermined value if the object recognized in the previous measurement cycle is not recognized in the current measurement cycle.

10 Claims, 8 Drawing Sheets

U.S. PATENT DOCUMENTS

| | | | |
|---|---|---|---|
| 6,173,215 B1* | 1/2001 | Sarangapani | 700/255 |
| 6,721,659 B2* | 4/2004 | Stopczynski | 701/301 |
| 7,034,668 B2* | 4/2006 | Engelman et al. | 340/435 |
| 7,042,389 B2* | 5/2006 | Shirai | 342/70 |
| 7,587,260 B2* | 9/2009 | Bruemmer et al. | 700/253 |
| 7,818,090 B2* | 10/2010 | Okamoto | 700/253 |
| 7,826,927 B2* | 11/2010 | Kawaguchi et al. | 700/253 |
| 2003/0174054 A1* | 9/2003 | Shimomura | 340/435 |
| 2004/0193323 A1* | 9/2004 | Higaki et al. | 700/259 |
| 2004/0257211 A1* | 12/2004 | Kudo | 340/435 |
| 2005/0102089 A1* | 5/2005 | Linden | 701/96 |
| 2006/0104481 A1* | 5/2006 | Demro et al. | 382/104 |
| 2006/0274149 A1* | 12/2006 | Yoshizawa | 348/148 |
| 2007/0139523 A1* | 6/2007 | Nishida et al. | 348/148 |

FOREIGN PATENT DOCUMENTS

| | | |
|---|---|---|
| JP | 53-016230 | 2/1978 |
| JP | 06-174846 A | 6/1994 |
| JP | 06-174847 A | 6/1994 |
| JP | 09-326032 | 12/1997 |
| JP | 10-143245 A | 5/1998 |
| JP | 2004-171165 A | 6/2004 |

OTHER PUBLICATIONS

International Search Report 08006602.0-2220 dated Jul. 3, 2008.

Takeno J. et al.; "Realization of a 3D Vision Mobile Robot that can Avoid Collision with Moving Obstacles"; Apr. 11, 1991; 2010-2023.

Weihong Yang, et al.; "A Quick Intelligent Control System for Mobile Robot to Avoid Collision with Moving Obstacles"; Aug. 1, 2005; pp. 569-576.

Tadokoro S. et al.; "On Motion Planning of Mobile Robots which Coexist and Cooperate with Human"; Aug. 5, 1995; pp. 518-523.

* cited by examiner

ROUTING APPARATUS FOR AUTONOMOUS MOBILE UNIT

BACKGROUND OF THE INVENTION

1. Field of the Invention

The present invention relates to a routing apparatus installed on an autonomous mobile unit.

2. Description of the Related Art

Japanese Patent Application Publication No. 53-16230 describes a vehicle collision avoidance system which detects distance from an obstacle and relative velocity using a radar system. The vehicle collision avoidance system evaluates a risk of collision. When a reflected signal from the obstacle becomes so weak that the obstacle can no longer be detected, the vehicle collision avoidance system estimates the distance from the obstacle and the relative velocity using information obtained so far and evaluates a risk based on the estimation.

Japanese Patent No. 3,866,328 describes an object recognition system which identifies a three-dimensional object around a vehicle based on a distribution of distance to the object, determines relative position of the vehicle and the object, deletes the objects when the relative position falls outside a predetermined range centered on the vehicle, stores any newly detected object, and determines a possibility of collision with the object. Since the object recognition system updates the positions of detected objects as the vehicle travels, an object that is detected multiple times is calculated as multiple objects, limiting movement of the vehicle.

A robot which travels autonomously in an office or home is required to travel without coming into collision with persons. Persons travel slowly, but at uneven speeds. Also, persons tend to stop or change direction suddenly. In such an environment, the robot needs to determine a travel path by avoiding collisions with the persons.

An autonomous mobile unit travels by performing data processing of images appearing in a limited field of view to detect objects, especially persons, around the autonomous mobile unit and correcting its path so as to avoid collision with the persons. The problem here is how to handle a situation in which an object hitherto visible to the autonomous mobile unit goes out of sight. Specifically, as the autonomous mobile unit travels, the field of view sways, causing an object on boundaries of the field of view to go in and out of sight. Also, when the autonomous mobile unit changes courses, the field of view changes as well, which may cause the persons who are hitherto within the field of view disappear from the field of view. Furthermore, due to measurement errors of a sensor which detects objects or due to computational errors in sensor outputs, it may instantaneously become impossible to detect objects. If path computations are performed by deleting data on a person that is out of the field of view, the deleted person may appear in the field of view suddenly at close range when the autonomous mobile unit changes direction again, obstructing smooth travel of the autonomous mobile unit. However, a large storage capacity is needed to continue saving data on out-of-sight objects. Since human motions are erratic, motions of out-of-sight persons cannot be estimated with reliability. Thus, it is important how to handle data on persons that appear and disappear in sight.

SUMMARY OF THE INVENTION

In environments such as described above, autonomous mobile units are required to deal appropriately with a situation in which an object hitherto has been visible goes out of sight and perform path determination so as to avoid a collision with the object. Also, it is necessary to reduce a phenomenon in which a single object is recognized as multiple objects due to computational errors or along with movements of the object, excessively restricting the motion of the mobile unit.

To solve the above problem, the present invention provides a routing apparatus comprising a sensor unit which has capabilities of detecting an object in a target field of view and of measuring position of the object. The routing apparatus includes an electronic control unit which controls movement of the autonomous mobile unit. The electronic control unit is programmed to perform the functions of determining velocity and a travel direction of the object based on changes in the position of the object obtained from the sensor unit over a plurality of measurement cycles, of determining a path of the autonomous mobile unit so as to avoid collision with the object based on the position, the velocity, and the travel direction of the object, of storing an object recognized in the previous measurement cycle by setting the velocity of the object to a value equal to or lower than a predetermined value if the object is not recognized in the current measurement cycle, and of determining the path of the autonomous mobile unit by taking into consideration the objects stored in the memory.

According to the present invention, when an object which hitherto has been visible goes out of sight, the electronic control unit of the routing apparatus stores position information about the object in a memory by setting the velocity of the object to a value equal to or lower than a predetermined value and determines the path of the autonomous mobile unit by taking contents of the memory into consideration. Since the path has been determined by taking approximate position of the object into consideration, even if the object comes into the field of view again, it is possible to avoid collision with the object.

According to one aspect of the present invention, when an object which hitherto has been visible goes out of sight, the electronic control unit of the routing apparatus performs path determination by setting the velocity of the object to zero. That is, if a person who hitherto has been visible disappears from sight, the electronic control unit performs path determination by assuming that the person is still at the given position. Human motions are erratic, and persons tend to stop or change directions suddenly. It is not possible to predict such human motions with reliability. According to this aspect of the present invention, since the electronic control unit determines the path of the autonomous mobile unit assuming that any out-of-sight person is located in a predetermined range centered on his/her original position, it is possible to prevent major errors in the position of the person and thereby improve the reliability of path determination. Also, it is more likely that an object will reappear in the field of view when the object stops than when the object continues traveling.

According to another aspect of the present invention, information about the object recognized in the previous measurement cycle and not recognized in the current measurement cycle is erased after a lapse of an estimated time required for the autonomous mobile unit to almost reach the object. This makes it possible to use memory effectively.

According to another aspect of the present invention, stored information about the object recognized in the previous measurement cycle and not recognized in the current measurement cycle is erased from the memory when an object is detected near the previously recognized object.

By organizing information about the object in this way, it is possible to alleviate constraints placed on the path determination of the autonomous mobile unit and increase flexibility of travel.

According to another aspect of the present invention, information about the object stored in the memory is erased if no object is detected at the position of the stored object when the position of the stored object is included in the field of view again after once moving out of the field of view. This also makes it possible to increase flexibility of travel of the autonomous mobile unit.

DETAILED DESCRIPTION OF THE PREFERRED EMBODIMENTS

Now, an embodiment of the present invention will be described with reference to the drawings. In the present embodiment, a humanoid (bipedal) robot is taken as an example of an autonomous mobile unit. Such a robot is equipped with a built-in electronic control unit (ECU), which controls behavior of the robot. Basically, the ECU is a computer which includes a processor (CPU), random access memory (RAM) which provides a working area for the CPU, read-only memory (ROM) which stores computer programs and data, input interface which receives signals from sensors installed in various parts of the robot and processes the signals, and output interface which sends drive signals to actuators in various parts of the robot. The present invention adds new functions to such an existing electronic control unit.

Figure 1:
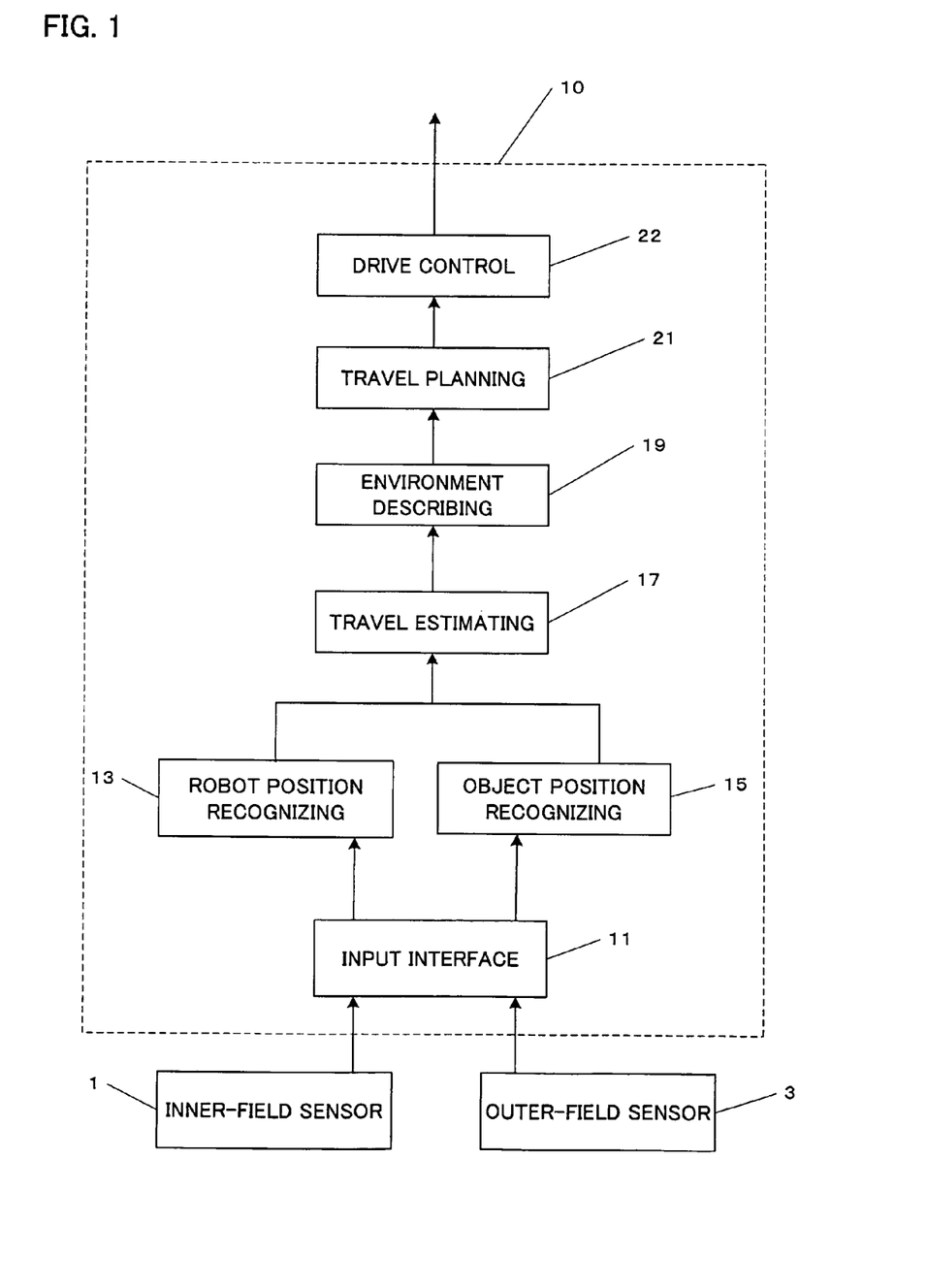
FIG. 1 is a functional block diagram showing an overall configuration of an object recognition system according to the present invention.

FIG. 1 is a functional block diagram of an ECU 10 equipped with the functions added by the present invention. Signals from an inner-field sensor 1 and outer-field sensor incorporated in the robot are sampled and subjected to A/D (analog/digital) conversion by the input interface 11, and then sent to a robot position recognizing unit 13 and object position recognizing unit 15, respectively.

The inner-field sensor 1 may include an encoder, gyro, acceleration sensor, or the like. In the field of robotics, it is a common practice to estimate an amount of change in travel in a predetermined time based on signals obtained by such sensors, time-integrate the amount of change, and thereby calculate a total amount of travel from an initial position. This technique is known as a dead reckoning method. The robot position recognizing unit 13 estimates the position and travel velocity of the robot in an absolute coordinate system by the dead reckoning method based on the signals from the inner-field sensor 1. The robot position recognizing unit observes feature points (landmarks) in an external environment based on signals from the outer-field sensor 3 and can identify the robot position by checking the robot position against an environmental map possessed by the robot (stored in the ROM or RAM).

The outer-field sensor 3 may include a CCD camera, ultrasonic sensor, laser range finder, or the like. According to the present embodiment, the outer-field sensor 3 is a stereoscopic camera. The object position recognizing unit 15, which processes image data from the outer-field sensor 3, detects and extracts objects in images. The detected objects are approximated by graphics such as rectangles and ellipses, followed by subsequent data processing. According to the present embodiment, a visual field of the stereoscopic camera has the shape of a sector of 90 degrees wide and 9 meters deep. The scheme of calculating a distance to each pixel in the visual field based on the image data obtained by a stereoscopic camera and extracting objects from a background image based on the calculated distances is well-known in the art. The scheme of determining an optical flow based on two or more images with delay periods between them and extracting moving objects from a background image based on the optical flow is also well-known in the art. The object position recognizing unit 15 extracts an object from the visual field of the camera using such a technique.

A travel estimating unit 17 determines the positions of the robot and detected object in the absolute coordinate system using position information about the detected object provided by the object position recognizing unit 15 and position information about the robot provided by the robot position recognizing unit 13. In so doing, the travel estimating unit 17 compares the position of the detected object obtained at time ($t_0$), a current measurement, with the position obtained at time ($t_{-1}$), a previous measurement, and determines that the object detected at time ($t_0$), current measurement, is identical to the object detected at time ($t_{-1}$), previous measurement, if difference between the two positions falls within a predetermined range.

When a humanoid robot is placed in an office, an object moving in the environment is a person or another robot. Generally, possible velocity v of a person in an office ranges from 0 km/h standing still to 8 km/h. A moving range of the person within a measurement interval $\Delta t$ ($=t_0-t_{-1}$) is within a radius of $v\Delta t$ from the position of the person at time $t_{-1}$. According to the present embodiment, assuming that travel velocity of persons is v km/h (e.g., 4 km/h, which is an average travel velocity of persons in an office), if the position of a person detected at $t_0$ is within a radius of $v\Delta t$ from the position of a person detected at time $t_{-1}$, the travel estimating unit 17 determines that the two persons are identical.

In computations for the determination, errors in measurement of positions may be determined statistically, and the range described above can be determined by adding the errors. According to the present embodiment, the measurement error is 16 cm.

The travel estimating unit 17 determines the travel velocity and travel direction of a person in the field of view of the robot A based on the positions of the person at time ($t_{-1}$), previous measurement, and at time ($t_0$) current measurement. If the person stands still, the travel estimating unit 17 sets the velocity of the person to zero.

An environment describing unit 19 generates an interference zone and an estimated sweeping zone based on information about the detected object—i.e., position, shape, and velocity, and travel direction—recognized by the travel estimating unit 17 as well as robot position information obtained by the robot position recognizing unit 13, travel velocity specified by a program, and predetermined robot shape.

Figure 2:
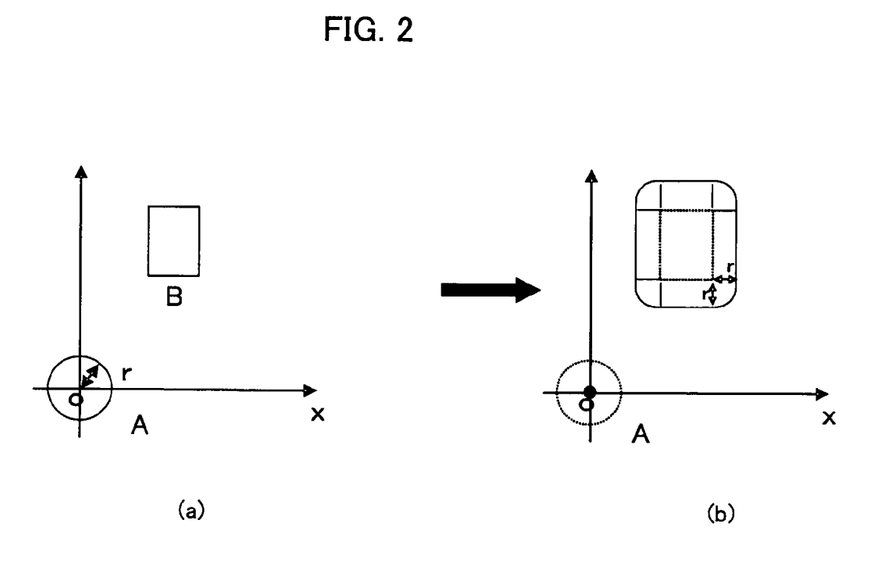
FIG. 2 is a diagram showing an example of the Minkowski sum.

FIG. 2 shows detected position in a coordinate system by approximating the shape of the robot A by a circle of radius r and approximating a detected object B by a rectangle, with the current position of the robot A being located at a coordinate origin. An interference zone C of a person B is determined using the Minkowski sum of the circle of radius r which represents the robot A and the rectangle which represents the detected object B. The Minkowski sum is a known logic and is given by the following equation.

$$A \oplus B = \{a+b | a \in A, b \in B\}$$ [Formula I]

Figure 3:
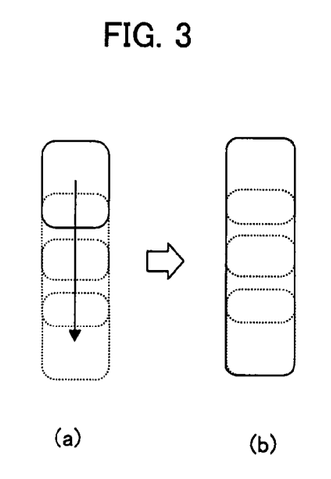
FIG. 3 is a diagram showing how a estimated sweeping zone M is generated by extending a interference zone C.

A estimated sweeping zone M is obtained by extending the interference zone C in the travel direction of the robot or person B that is the detected object. Referring to FIG. 3, the estimated sweeping zone M is an area in which the person B moves in the detected travel direction within a predetermined time period and is obtained by extending the interference zone C in the travel direction of the person B. The predetermined time period is the time (estimated travel time) required for the robot A to reach the position of the person B while the estimated sweeping zone M is the area in which the person B is expected to travel in the time period. The estimated travel time is given by the following equation.

$$T = (\text{distance from robot } A \text{ to person } B)/(\text{relative velocity of } A \text{ and } B) \quad (2)$$

The estimated sweeping zone is obtained by extending the interference zone in the travel direction of the person B by "the velocity of the person×T."

Figure 4:
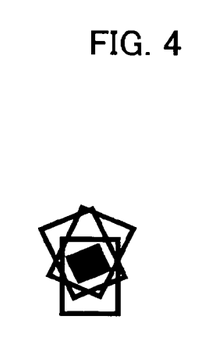
FIG. 4 is a diagram showing how the estimated sweeping zone M fluctuates if the estimated sweeping zone M is generated with too high sensitivity.

FIG. 4 shows fluctuations of an estimated sweeping zone when detected data on the person B is too sensitive.

Figure 5:
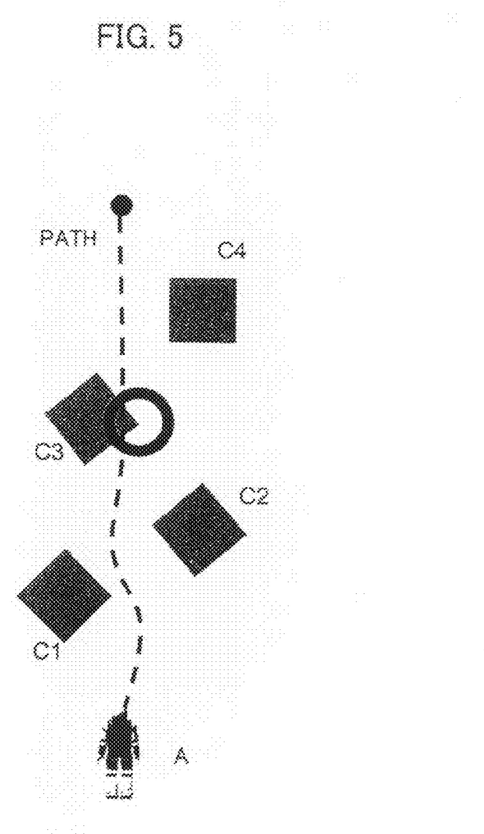
FIG. 5 is a diagram showing an example of relationship between interference zones C1 to C4 and a path of a robot A.
Figure 6:
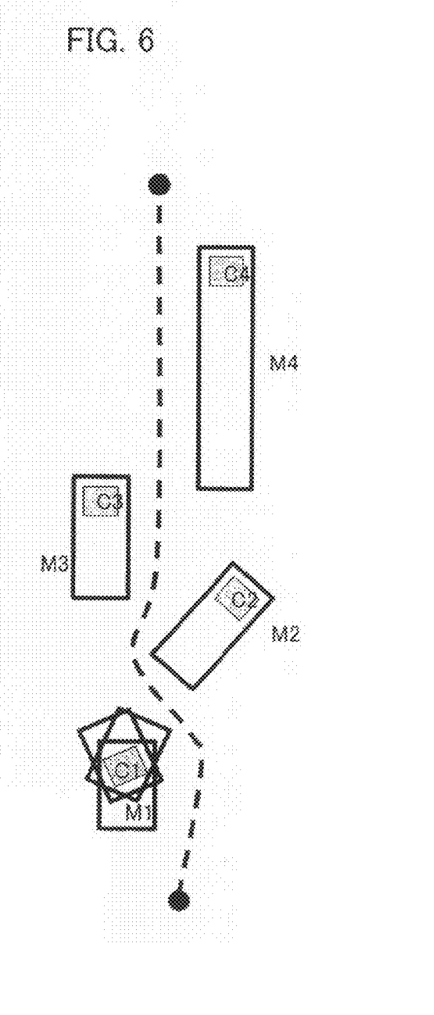
FIG. 6 is a diagram showing an example of relationship between estimated sweeping zones M1 to M4 and the path of the robot A.

A travel planning unit 21 generates a path which the robot A will take for traveling to a destination point. Referring to FIG. 5, when the robot A travels along a set path, the travel planning unit 21 determines whether the set path interferes with interference zones C1 to C4 generated at time ($t_{-1}$) of measurement. In the example of FIG. 5, the path interferes with the interference zone C3 as indicated by a circle. In such a case, the travel planning unit 21 generates a path which will not interfere with sweeping zones M1 to M4 of the person B, as shown in FIG. 6. If a path is not set at time ($t_{-1}$) of measurement, the travel planning unit 21 generates a path to a default destination point using a similar method.

Figure 7:
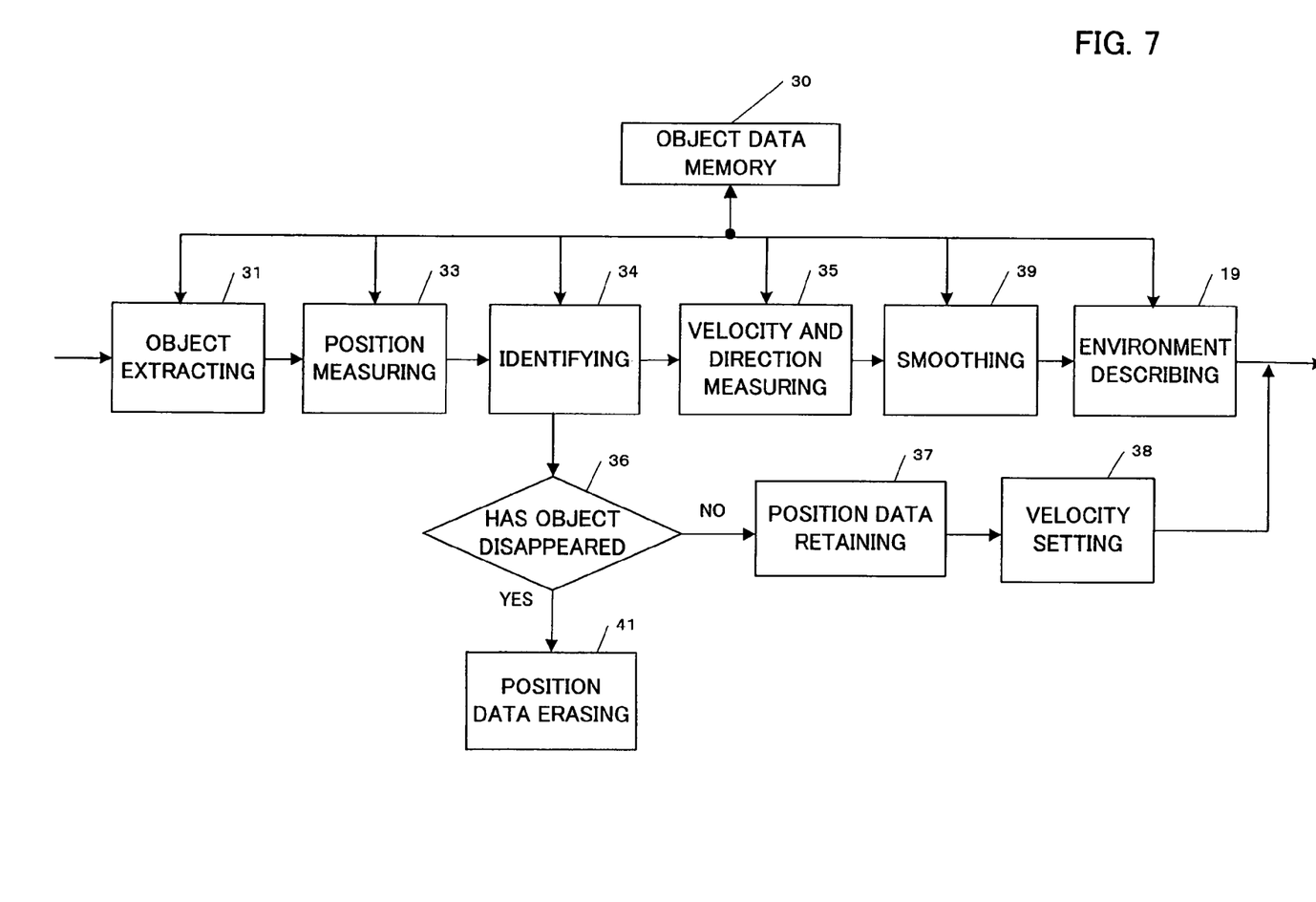
FIG. 7 is a detailed functional block diagram of an object position recognizing unit 15 and travel estimating unit 17 in FIG. 1.

FIG. 7 is a detailed functional block diagram of the object position recognizing unit 15 and travel estimating unit 17 illustrated in FIG. 1. An object extracting unit 31 extracts an object, a person or a robot, from image data obtained from the outer-field sensor 3. Then, a position measuring unit 33 measures the position of the object. Position data resulting from the measurement is stored in an object data memory 30. If an object detected at time ($t_0$) of the current measurement is located within a radius of v∆t from the position of an object detected at the time ($t_{-1}$) of the previous measurement (where v is the travel velocity of the object and ∆t is the measurement interval, i.e., $t_0$-$t_{-1}$), an identifying unit 34 determines that the object detected this time is identical to the object detected the previous time and stores the position data by associating the position data with the object.

If the object previously recognized is not recognized this time ($t_0$) by the identifying unit 34, an object disappearance determining unit 36 sends a signal to a position data retaining unit 37, indicating that the object is no longer visible to the robot. Possible situations in which the object goes out of the robot's sight include a situation in which the object is located on boundaries of the robot's field of view and comes in and out of sight, a situation in which the object cannot be detected due to measurement errors of sensors or computational errors in sensor outputs, and a situation in which the robot's field of view changes as the path curves. The position data retaining unit 37 keeps the data which represents the positions of the object stored in the object data memory 30, i.e., retains the data. A velocity setting unit 38 sets velocity of the object to a value sufficiently smaller than average velocity of persons, e.g., to zero, and stores the velocity in the object data memory 30. Consequently, although the object is not detected because it is outside the field of view of the robot A or for some other reasons, the object is treated as being still at the previous position.

The object disappearance determining unit 36 may determine that the object has moved out of the robot's field of view when the object is not recognized after two or a few measurements. The object disappearance determining unit 36 may perform disappearance determination only for an object determined to be identical a few times before the previous measurement.

A smoothing unit 39 calculates the travel velocity and travel direction of an object based on position data of the object over a predetermined number of measurement cycles. A velocity and direction measuring unit 35 calculates the velocity and direction of the object in each measurement (sampling). The smoothing unit 39 calculates a smoothed velocity of the object as a moving average of the velocity values calculated by the velocity and direction measuring unit 35 over a predetermined number of measurement cycles.

The travel direction of an object is calculated from changes in the position of the same object over a predetermined number of measurement cycles as in the case of the travel velocity. The travel direction is calculated as a direction in a two-dimensional coordinate system of an environment map stored in the memory of the robot A. The travel direction is stored in the object data memory 30 in association with the detected object.

The velocity and direction data thus smoothed is sent to environment describing unit 19 (described with reference to FIG. 1) and is used by the environment describing unit 19 to calculate an interference zone and an estimated sweeping zone of the object.

The object disappearance determining unit 36 determines in the following three cases that an object has disappeared, and, responsive to this determination, a position data erasing unit 41 erases data on the object from the object data memory 30.

First, an object recognized in the previous measurement cycle and not recognized in the current measurement cycle is erased from the object data memory 30 as having moved in another direction if the object is not detected after a lapse of an estimated time required for the robot A to reach the object.

Secondly, an object located near the boundaries of the robot's field of view comes in and out of sight due to swaying of the robot. In such a case, the identifying unit makes unreliable identifications. Consequently, the same object may be recognized as different objects and a plurality of objects relatively close to each other may be stored in the object data memory 30, unduly restricting a travel path of the robot. To eliminate this phenomenon, near the boundaries of the robot's field of view, any recorded object within a predetermined radius of 70 cm for example, which is an average size of persons, from a newly detected object is estimated to be identical to the newly detected object. Old data on the recorded object is erased from the object data memory 30.

Thirdly, in a situation where a position stored in the object data memory 30 as the position of an object moves out of the robot's field of view and then moves into the robot's field of view again, if no object is detected at this position or in its estimated sweeping zone M, the object is erased from the object data memory 30 as having moved in another direction.

Figure 8:
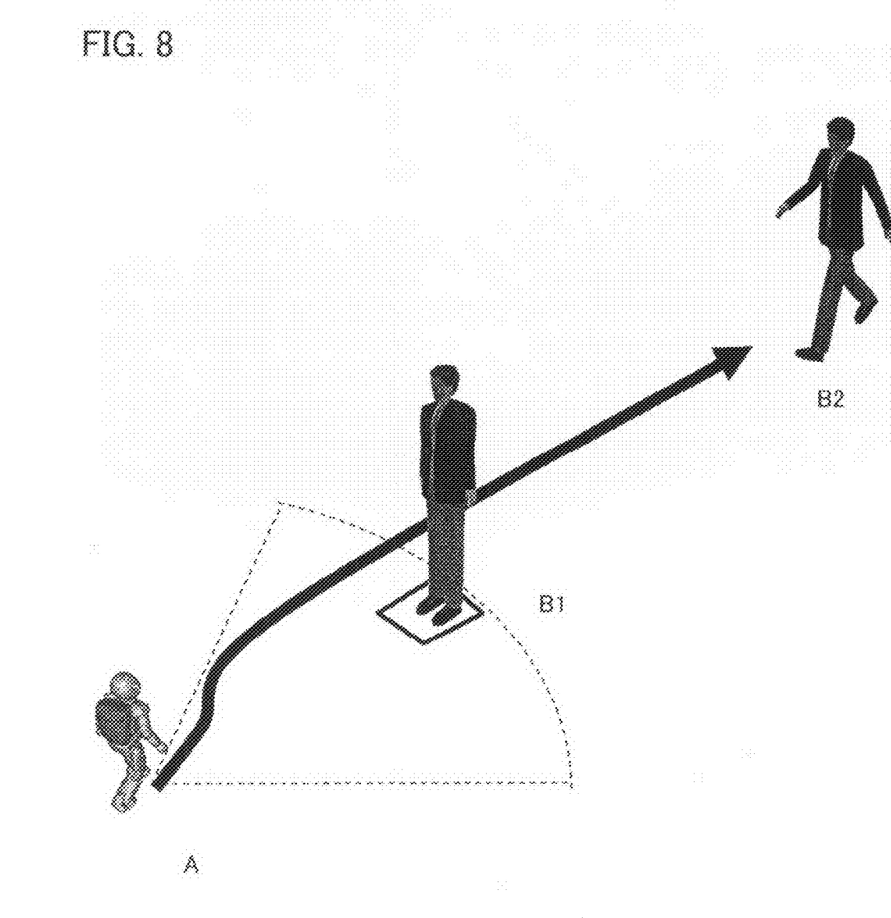
FIG. 8 is a diagram showing the presence of a person B1 in the field of view of the robot A.

In FIG. 8, the field of view of the robot A is represented by a dotted sector. In this example, the field of view of a stereoscopic camera installed on the robot A is 90 degrees wide and 9 meters deep. An object (person B1) in the field of view of the robot A is shown in an estimated sweeping zone. The travel planning unit 21 determines a path in such a way as to avoid the person B1 in the course of the robot A and a drive control unit 22 drives the robot A along the determined path.

Figure 9:
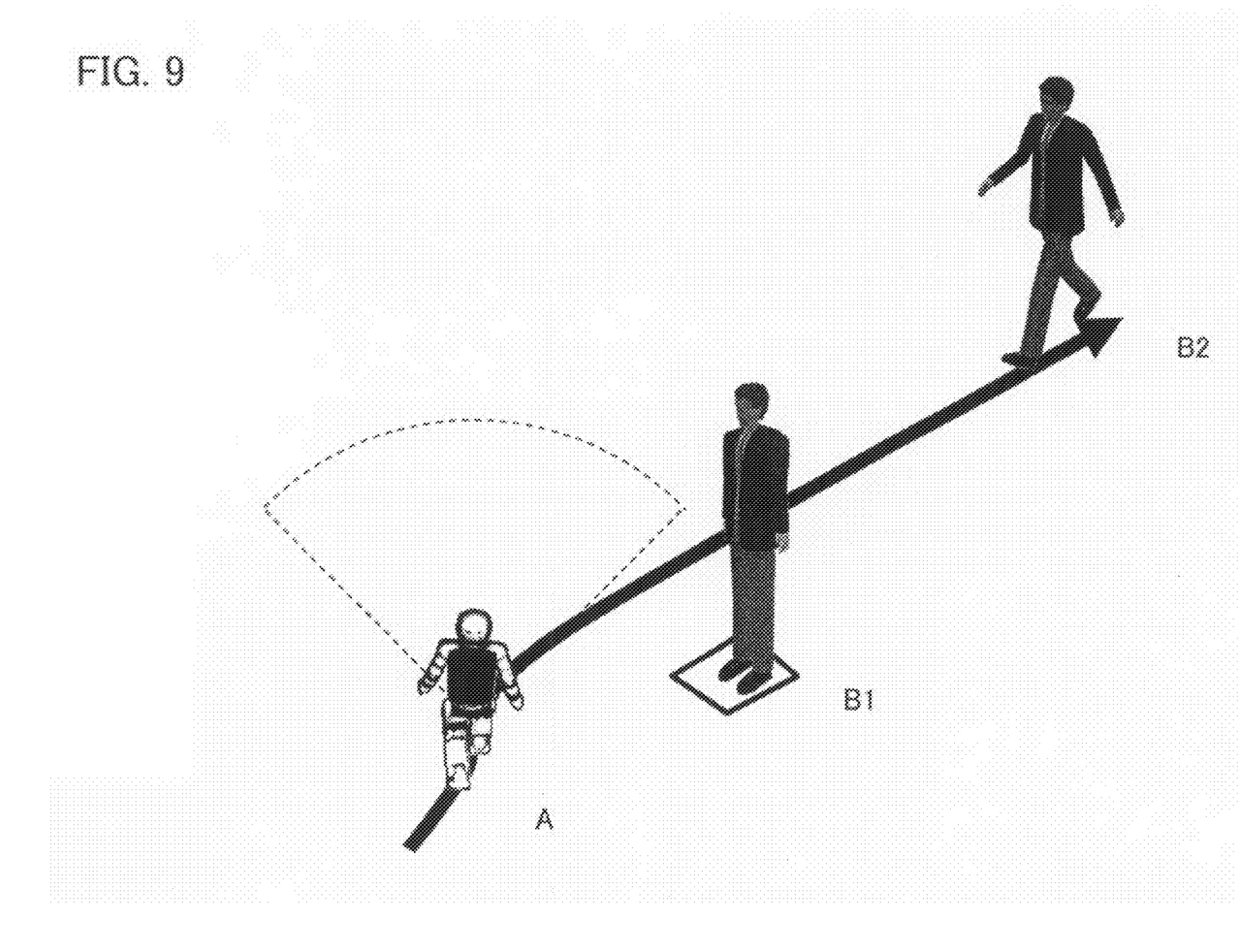
FIG. 9 is a diagram showing how the person B1 disappears from the field of view of the robot A after the robot A takes an action to avoid the person B1.

FIG. 9 shows the scene where the robot A has changed directions to avoid the person B1. At this time, the person B1 disappears from the field of view of the robot A. As no object is found which is identical to the person B1, the object disappearance determining unit 36 determines that the person B1 is out of the field of view of the robot A. Consequently, the position data retaining unit 37 holds the position data of the person B1 in the object data memory 30. The velocity setting unit 38 sets the velocity of the person B1 to zero accordingly and records the velocity in the object data memory 30.

Figure 10:
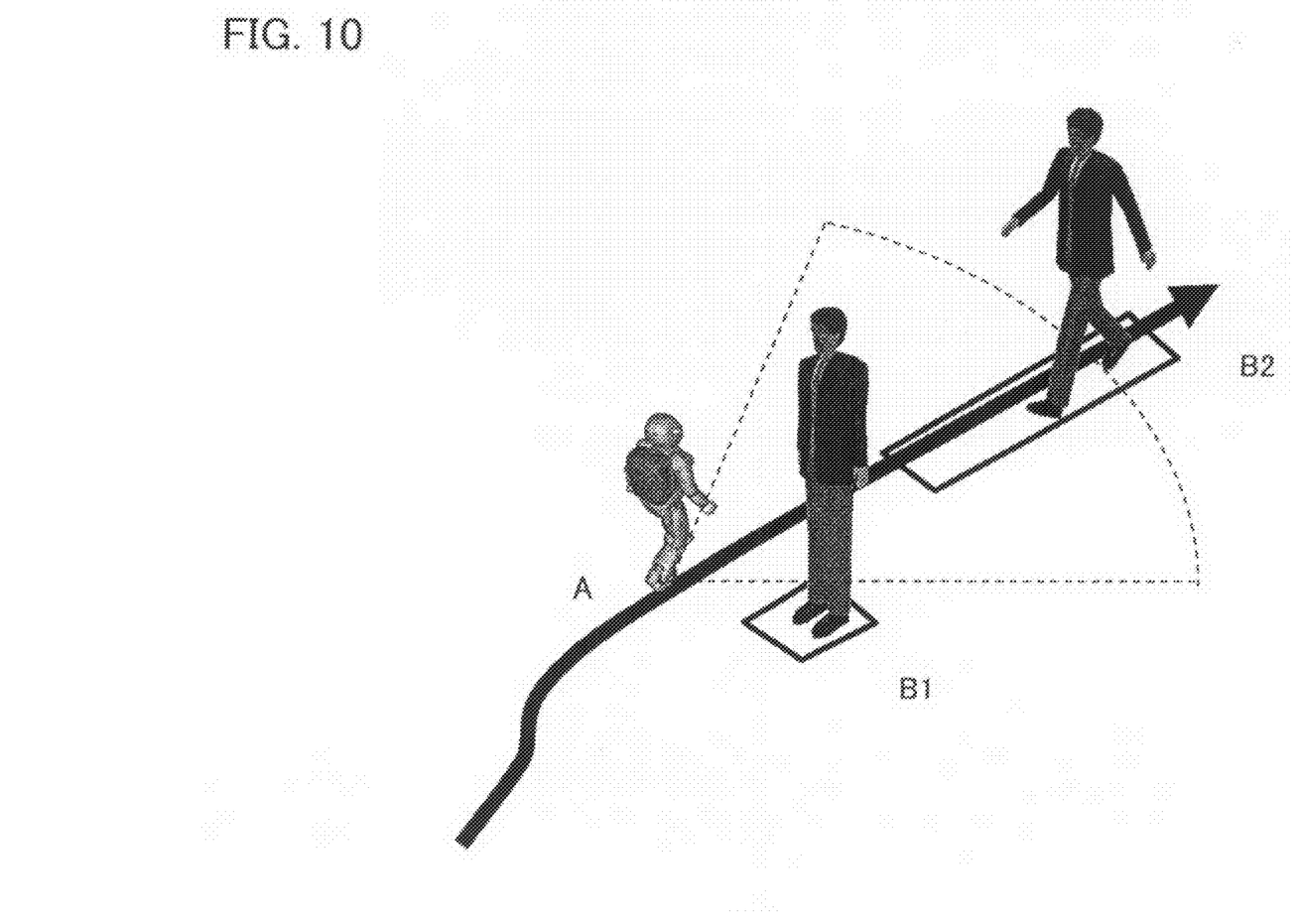
FIG. 10 is a diagram showing how the robot A turns again in the direction of a destination.

FIG. 10 shows how the robot A turns again in the direction of a destination point after avoiding the person B1. At this time, a person B2 is recognized along the course in the field of view. The person B1, who is outside the field of view of the robot A, has been stored in the object data memory 30 as having a velocity of zero, i.e., as being still at the last position detected in the field of view.

Figure 11:
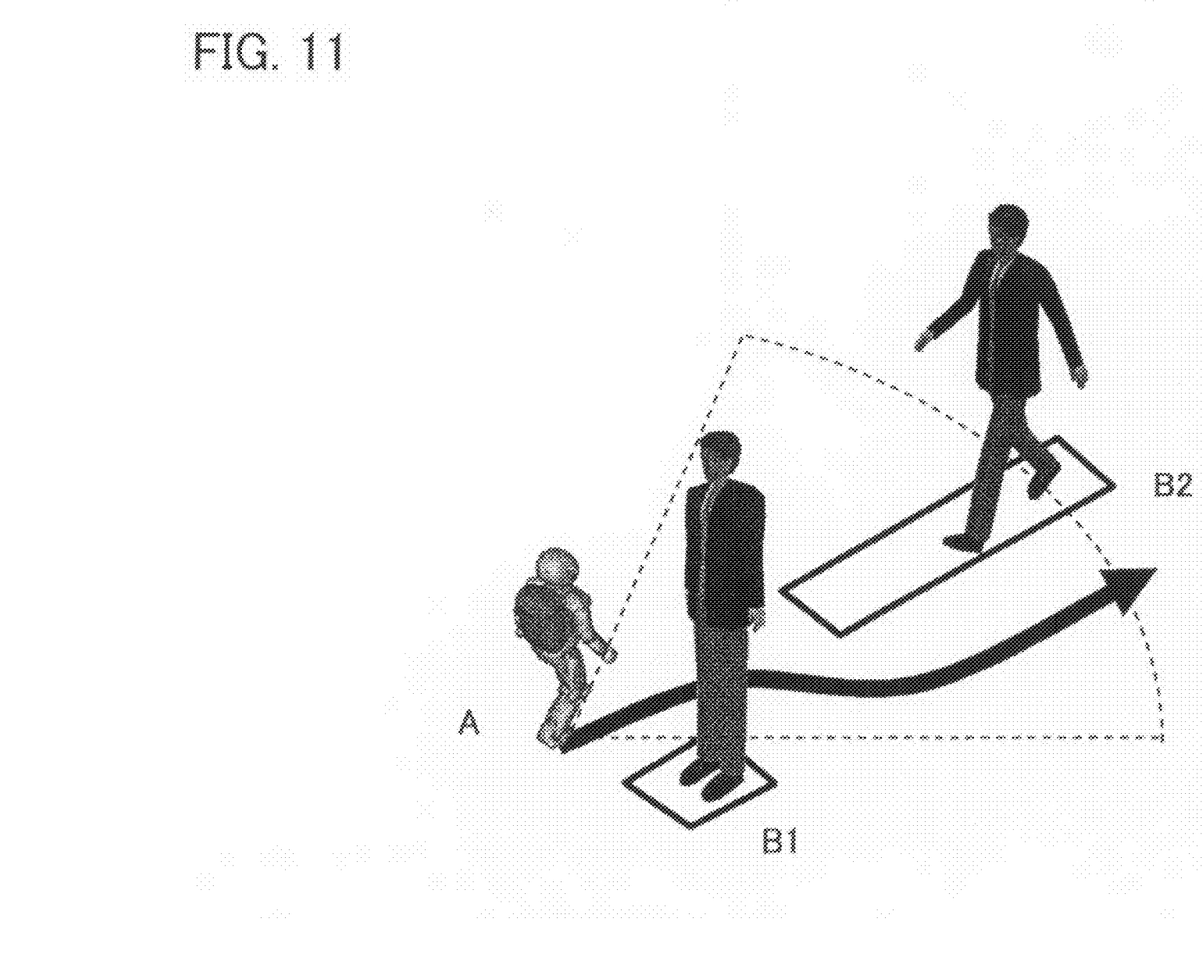
FIG. 11 is a diagram showing how the robot A travels by avoiding the person B1 who is outside the field of view and a person B2 who is in the field of view.

Referring to FIG. 11, the travel planning unit 21 determines the travel path of the robot A by taking into consideration of the presence of the person B1 with reference to the object data memory 30 and also taking into consideration of the person B2 moving toward the robot A. This allows the robot A to move toward the destination point without colliding with the person B1 who is outside the field of view and without obstructing the person B2.

A specific embodiment of the present invention has been described above, but the present invention is not limited to the embodiment described above.

What is claimed is:

1. A routing apparatus installed on an autonomous mobile unit, comprising a sensor unit for detecting an object in a field of view and for measuring a position of the object, and an electronic control unit for controlling movement of the autonomous mobile unit, wherein the electronic control unit is programmed to perform the functions of:
   determining velocity and a travel direction of an object based on changes in the position of the object obtained from the sensor unit over a plurality of measurement cycles;
   determining a path of the autonomous mobile unit to avoid collision with the object based on the position, the velocity, and the travel direction of the object;
   setting the velocity of the object to a value equal to or lower than a predetermined value and storing the set value of the velocity in a memory if an object recognized in the previous measurement cycle is not recognized in the current measurement cycle; and
   determining the path of the autonomous mobile unit by taking into consideration of the object stored in the memory.

2. The routing apparatus according to claim 1, wherein the value equal to or lower than the predetermined value of the velocity of the object is zero.

3. The routing apparatus according to claim 1, wherein stored information about the object recognized in the previous measurement cycle and not recognized in the current measurement cycle is erased after a lapse of an estimated time required for the autonomous mobile unit to reach the object.

4. The routing apparatus according to claim 1, wherein information stored in the memory about the object recognized in the previous measurement cycle and not recognized in the current measurement cycle is erased from the memory when an object is measured near the previously recognized object.

5. The routing apparatus according to claim 1, wherein information about the object stored in the memory is erased if no object is detected at the position of the stored object after the position of the object goes out of the field of view and comes into the field of view again.

6. A computer implemented method for controlling movement of an autonomous mobile unit, comprising:
   determining velocity and a travel direction of an object based on changes in the position of the object obtained from a sensor unit over a plurality of measurement cycles;
   determining a path of the autonomous mobile unit to avoid collision with the object based on the position, the velocity, and the travel direction of the object;
   setting the velocity of the object to a value equal to or lower than a predetermined value and storing the set value of the velocity in a memory if an object recognized in the previous measurement cycle is not recognized in the current measurement cycle; and
   determining the path of the autonomous mobile unit by taking into consideration of the object stored in the memory.

7. The method according to claim 6, wherein the value equal to or lower than the predetermined value of the velocity of the object is zero.

8. The method apparatus according to claim 6, wherein stored information about the object recognized in the previous measurement cycle and not recognized in the current measurement cycle is erased after a lapse of an estimated time required for the autonomous mobile unit to reach the object.

9. The method according to claim 6, wherein information stored in the memory about the object recognized in the previous measurement cycle and not recognized in the current measurement cycle is erased from the memory when an object is measured near the previously recognized object.

10. The method according to claim 6, wherein information about the object stored in the memory is erased if no object is detected at the position of the stored object after the position of the object goes out of the field of view and comes into the field of view again.

* * * * *